US008175942B2

(12) United States Patent
Crist et al.

(10) Patent No.: US 8,175,942 B2
(45) Date of Patent: May 8, 2012

(54) SYSTEMS AND METHODS FOR ENHANCING COMPLIANCE WITH THE FEDERAL RESERVE CUSTODIAL INVENTORY (CI) PROCEDURES

(75) Inventors: Kristy M. Crist, Charlotte, NC (US); Adam S. Byerley, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 477 days.

(21) Appl. No.: 12/036,431

(22) Filed: Feb. 25, 2008

(65) Prior Publication Data

US 2009/0216662 A1    Aug. 27, 2009

(51) Int. Cl.
*G06Q 40/00* (2012.01)
(52) U.S. Cl. .......................................................... 705/35
(58) Field of Classification Search .............. 705/1–55; 709/2–206; 1/1; 235/379; 250/282–395
See application file for complete search history.

(56) References Cited

U.S. PATENT DOCUMENTS

| | | | | |
|---|---|---|---|---|
| 6,034,605 A | * | 3/2000 | March | 340/573.1 |
| 6,493,683 B1 | * | 12/2002 | David et al. | 705/37 |
| 2003/0018513 A1 | * | 1/2003 | Hoffman et al. | 705/10 |
| 2007/0100750 A1 | * | 5/2007 | Hartfield et al. | 705/43 |

OTHER PUBLICATIONS

Robert deV. Frierson, Federal Reserve Currency Recirculation Policy, Mar. 23, 2006, Federal Register, vol. 71 No. 56, 14694-14701.*
Divakar Rajamani¤, H. Neil Geismary, Chelliah Sriskandarajahz, A Framework to Analyze Cash Supply Chains, Oct. 22, 2005, web, 1-19.*
/www.frbservices.org/files/operations/pdf/CI_RoadMapPS_L01A.pdf/ retrieved on Sep. 5, 2008.
/www.carreker.com/ retrieved on Sep. 5, 2008.

* cited by examiner

*Primary Examiner* — Marissa Liu
(74) *Attorney, Agent, or Firm* — Weiss & Arons LLP; Michael Springs (57) ABSTRACT

Systems, methods and consumer-readable media for enhancing compliance with the Federal Reserve Custodial Inventory procedures are provided. The system may include an inventory management system for retrieving cash balance inventory information and an information management system for receiving Fed Cash information. This information may be retrieved using specific process steps and predetermined timing. The cash balance inventory information may include information about the amount of unverified cash in inventory. The Fed Cash information may include Custodial Inventory information, minimum vault holding requirement information, a Federal Reserve Cap and physical space cap for Custodial Inventory. The system may also display an amount that can be deposited in the Custodial Inventory. The amount may be based at least in part on the cash balance inventory information, the Custodial Inventory information, the minimum vault holding requirement information, the Federal Reserve Cap for Custodial Inventory and a ratio of 10 and/or 20 dollar bills in unverified cash balance to a total unverified cash balance.

5 Claims, 9 Drawing Sheets

| | | 10/1/2007 | 10/2/2007 | 10/3/2007 | 10/4/2007 | 10/5/2007 | 10/9/2007 | 10/10/2007 |
|---|---|---|---|---|---|---|---|---|
| 602 — CI transactions that are calculated | | | | | | | | |
| Holdover work-in-process | 10s | $ 104,390.00 | $ 128,060.00 | $ 149,370.00 | $ 130,370.00 | $ 46,380.00 | $ 62,350.00 | $ 66,950.00 |
| | 20s | $ 1,529,440.00 | $ 1,832,940.00 | $ 2,852,400.00 | $ 2,740,940.00 | $ 742,300.00 | $ 1,340,580.00 | $ 883,660.00 |
| 604 — Non-useable work-in-process Inventory 1 | 10s | $ - | $ - | $ - | $ - | $ - | $ - | $ - |
| | 20s | $ - | $ - | $ - | $ - | $ - | $ - | $ - |
| 606 — Non-useable work-in-process Inventory 2 | 10s | $ 15,680.00 | $ 20,680.00 | $ 104,390.00 | $ 9,300.00 | $ 6,470.00 | $ - | $ 5,170.00 |
| | 20s | $ 31,160.00 | $ 71,100.00 | $ 104,390.00 | $ 23,320.00 | $ 19,760.00 | $ - | $ 26,800.00 |
| 608 — Inventory 3 | 10s | $ - | $ - | $ - | $ - | $ - | $ - | $ - |
| | 20s | $ - | $ - | $ - | $ - | $ - | $ - | $ - |
| 610 — Inventory 4 | 10s | $ - | $ - | $ - | $ - | $ - | $ - | $ - |
| | 20s | $ - | $ - | $ - | $ - | $ - | $ - | $ - |
| 612 — Non-useable work-in-process Inventory 5 | 10s | $ 17,530.00 | $ 17,750.00 | $ 20,850.00 | $ 7,840.00 | $ 9,070.00 | $ 9,800.00 | $ 4,230.00 |
| | 20s | $ 45,260.00 | $ 37,760.00 | $ 48,040.00 | $ 29,580.00 | $ 19,120.00 | $ 18,460,000.00 | $ 16,480.00 |
| 614 — Inventory 6 | 10s | $ - | $ - | $ - | $ - | $ - | $ - | $ - |
| | 20s | $ - | $ - | $ - | $ - | $ - | $ - | $ - |
| 616 — Inventory 7 | 10s | $ - | $ - | $ - | $ - | $ - | $ - | $ - |
| | 20s | $ - | $ - | $ - | $ - | $ - | $ 15,580,150.00 | $ - |
| 618 — Unverified Balance 1 | | $ 25,340,491.00 | $ 13,181,872.00 | $ 12,576,830.00 | $ 15,409,945.00 | $ 10,146,394.00 | $ 10,653,537.00 | |
| 620 — Unverified Balance 2 | | $ 3,341,331.00 | $ 3,280,433.00 | $ 3,258,983.00 | $ 5,252,775.00 | $ 4,129,934.00 | $ 838,654.00 | $ 1,433,692.00 |
| 622 — Fully Verified | 10s | $ 919,190.00 | $ 5,000,000.00 | $ 1,405,740.00 | $ 2,161,670.00 | $ 2,429,270.00 | $ 2,611,270.00 | $ 2,138,000.00 |
| | 20s | $ 4,227,180.00 | $ 12,289,000.00 | $ 13,861,540.00 | $ 24,994,700.00 | $ 10,757,840.00 | $ 3,829,140.00 | |
| 624 — Minimum required bank vault holding | | $ 21,288,334.00 | $ 21,288,334.00 | $ 21,288,334.00 | $ 21,288,334.00 | $ 21,800,046.00 | $ 21,800,046.00 | $ 21,800.00 |
| 626 — Current CI Balance | | $ 10,000,000.00 | $ 7,800,000.00 | $ 5,000,000.00 | $ 2,000,000.00 | | $ 280,000.00 | $ 9,600,000.00 |
| 628 — Change orders, Fed ship outs, cash coversion done? Enter "Yes" After Completion of Tasks | | Yes | Yes | | Yes | Yes | Yes | Yes |
| 630 — OUTPUT: | | | | | | | | |

FIG. 6

Logic Formulas

| | | | | | | | |
|---|---|---|---|---|---|---|---|
| 702 | Subtotal non-useable WIP | $ 1,743,460.00 | $ 2,108,290.00 | $ 3,134,020.00 | $ 2,941,350.00 | $ 843,100.00 | $ 19,872,730.00 | $ 1,003,290.00 |
| 704 | Total unverified | $ 28,681,822.00 | $ 16,462,305.00 | $ 15,835,813.00 | $ 20,662,720.00 | $ 14,278,328.00 | $ 11,492,191.00 | $ 17,013,842.00 |
| 706 | Historical ratio of verified 10s and 20s to total | 35% | 35% | 35% | 35% | 35% | 35% | 35% |
| 708 | Amount of 10s and 20s in unverified funds | $ 10,038,637.70 | $ 5,761,806.75 | $ 5,542,534.55 | $ 7,231,952.00 | $ 4,997,414.80 | $ 4,022,266.85 | $ 5,954,844.70 |
| 710 | Additional cash required on bank books from fully verified funds | $ 9,506,236.30 | $ 13,418,237.25 | $ 12,611,779.45 | $ 11,115,032.00 | $ 15,959,531.20 | None | |
| 712 | Enough additional 10s and 20s in fully verified funds to satisfy minimum vault holdings? | No, Keeps all 865 10s and 20s in bank vault and move cash from CI to 865 | Yes | Yes | No, Keeps all 865 10s and 20s in bank vault and move cash from CI to 865 | Yes | N/A | N/A |
| 714 | Extra 10s and 20s available in fully verified funds? | No | Yes | Yes | No | Yes | Yes | Yes |
| 716 | Additional room in CI? | Yes | Yes | Yes | Yes | Yes | Yes | No |
| 718 | CI Inventory Cap | $ 40,000,000.00 | $ 40,000,000.00 | $ 40,000,000.00 | $ 40,000,000.00 | $ 40,000,000.00 | $ 40,000,000.00 | $ 87,200.00 |

FIG. 7

| | Minimum Vault Holding Requirement Check | MINIMUM REQUIREMENT NOT MET | OK | OK | EMPTY CI | OK | HIGH VALUE | CHECK VAULT HOLDINGS REQUIREMENT |
|---|---|---|---|---|---|---|---|---|
| 802 | | | | | | | | |
| 804 | Data Entry Check | OK | OK | INCOMPLETE | OK | INCOMPLETE | OK | OK |
| 806 | Cash that needs to be moved from CI to bank vault | $ 4,360,000 | None | None | $ 2,000,000 | None | None | $ 9,512,800 |
| 809 | Additional cash that can be moved from Bank vault to CI | None | $ 3,860,000 | $ 2,640,000 | None | $ 11,460,000 | $ 13,360,000 | None |
| 810 | Ending CI Balance Should Match Amount Below | | | | | | | |
| 812 | Custodial Inventory Ending Balance | $ 10,000,000 | $ 11,660,000 | ERROR | $ 2,000,000 | ERROR | $ 13,640,000 | 87,200 |
| 814 | Projected Benefits | $ 1,438.36 | $ 1,677.12 | | $ 287.67 | | $ 1,961.92 | $ 12.54 |

816 — Physical CI capacity $40,000,000

FIG. 8

| Information to be entered | — Key 902 |
| --- | --- |
| Information that is calculated | |

| | | | | |
| --- | --- | --- | --- | --- |
| Non-useable WIP | | 10s | $ | 10.00 } 904 |
| | | 20s | $ | 20.00 |
| Non-useable WIP | Inventory 1 | 10s | $ | 20.00 } 906 |
| | | 20s | $ | 20.00 |
| | Inventory 2 | 10s | $ | 10.00 } 908 |
| | | 20s | $ | 300.00 |
| | Inventory 3 | 10s | $ | 3,800.00 } 910 |
| | | 20s | $ | 289,000.00 |
| Non-useable WIP | Inventory 1 | 10s | $ | 28,000.00 } 912 |
| | | 20s | $ | 190.00 |
| | Inventory 2 | 10s | $ | 218,900.00 } 914 |
| | | 20s | $ | 2,880.00 |
| | Inventory 3 | 10s | $ | 2,890.00 } 916 |
| | | 20s | $ | 300.00 |

| Subtotal non-useable WIP | $ | 546,340.00 — 918 |
| --- | --- | --- |

| Minimum required bank vault holdings | $ | 750,000.00 — 920 |
| --- | --- | --- |

| CI Inventory Cap | $ | 100,000,000.00 — 922 |
| --- | --- | --- |

| Current CI Balance | $ | 90,000,000.00 — 924 |
| --- | --- | --- |

| Additional Cash Required on bank books | $ | 203,660.00 — 926 |
| --- | --- | --- |

| Fully Verified | 10s | $ | 500,000.00 } 928 |
| --- | --- | --- | --- |
| | 20s | $ | 500,000.00 |

| Enough additional 10s and 20s satisfy minimum vault holdings? | Yes — 930 |
| --- | --- |

| 10s or 20s that need to be moved from CI to bank vault | None — 932 |
| --- | --- |

| Extra 10s and 20s available in bank vault? | Yes — 934 |
| --- | --- |

| Additional room in CI? | Yes — 936 |
| --- | --- |

| Additional cash that can be moved from bank vault to CI | $ 796,340.00 — 938 |
| --- | --- |

FIG. 9

SYSTEMS AND METHODS FOR ENHANCING COMPLIANCE WITH THE FEDERAL RESERVE CUSTODIAL INVENTORY (CI) PROCEDURES

FIELD OF TECHNOLOGY

Aspects of the disclosure relate to compliance with Custodial Inventory ("CI") procedures.

BACKGROUND

The CI Program is a voluntary program offered by the Federal Reserve Bank (FRB) that allows financial institutions to move money, currently only $10 and $20 notes, to the FRB's books while physically maintaining custody of that cash. The program offers potential benefits to a participating bank in cost of funds savings and cross-shipping fees. One requirement of the program is that vaults maintain a minimum vault holding requirement of cash on the vault's books before that vault may participate in CI. The minimum vault holding requirement varies by vault and is recalculated weekly.

It would be desirable to provide a process and a tool to guide the bank vaults in the decision regarding how much money can be put into CI.

SUMMARY OF THE INVENTION

It is an object of this invention to provide a process and a tool to guide the bank vaults in the decision regarding how much money can be put into CI.

A method for enhancing compliance with the Federal Reserve Custodial Inventory requirements is provided. The method may include retrieving cash balance inventory information from an inventory management system. The cash balance inventory information may include information about the amount of unverified cash in inventory. The method may also include retrieving current Custodial Inventory information, minimum vault holding requirement information and a Federal Reserve Cap for Custodial Inventory. The method may also include displaying an amount that can be deposited in the Custodial Inventory based at least in part on the retrieving cash balance inventory information, the retrieving Custodial Inventory information, the minimum vault holding requirement information, the Federal Reserve Cap for Custodial Inventory and a ratio of 10 dollar bills and/or 20 dollar bills in unverified cash balance to a total unverified cash balance.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 6 is a spreadsheet filled with exemplary values according to the invention;

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

A decisioning method for guiding and, preferably, implementing CI decisioning making, is provided. A corresponding decisioning tool may provide participating cash vaults with a preferably real-time, structured, substantially error-proofed process for conducting their respective CI decision making.

One embodiment of the process instructs the vault (it should be understood that references herein to the "vault" are understood to refer to the representatives responsible for conduct of deposits stored in the vault or to refer to the software and/or hardware that is used to implement the vault's functions) to retrieve cash balance information from its respective inventory management software. The cash balance information data should preferably be retrieved after specific tasks have been executed. The cash balance information data should also be retrieved in a specific order in order to ensure that the vault does not expose itself to a vault holding violation. The details of the cash balance information and the specific order of information retrieval is explained below in greater detail. A vault holding violation occurs when the vault fails to maintain a minimum reserve of 10 dollar and 20 dollar notes in a CI-participating vault on a given business day. While this application focuses on systems and methods that relate to 10 dollar and 20 dollar notes, it should be understood that the processes and systems according to the invention claimed may be used on any suitable note.

The process according to the invention can also instruct the vault to retrieve its current CI ending balance and minimum vault holding requirement from FedCash, the Federal Reserve Bank ("FRB") tool used to process CI transactions. The retrieval can occur periodically at preferably system-set intervals, or upon request.

After the data described above, including the cash balance information, the CI ending balance and the minimum vault holding requirement has been collected, the data can be keyed into a spreadsheet that is programmed to perform several calculations and logic checks. The spreadsheet checks to make sure that all data has been entered and that it is within range of previous data values. Alert messages are returned to the user when data fields are left blank or the value that was entered is questionable.

Once all relevant data has been keyed in and validated, the spreadsheet can execute calculations and algorithms to determine how much inventory can be moved into or must be moved out of CI. These calculations and algorithms preferably include calculations and algorithms according to the invention.

One aspect of the tool according to the invention is that it can utilize inventory in various stages of processing throughout the vault and allocate inventory according to the FRB's guidelines. Certain portions of the inventory within the vault can be fully counted, strapped and bundled. This inventory is typically categorized as fully verified. At the other end of the spectrum, portions of the inventory may be unverified and not yet sorted or counted. Lastly, inventory can be categorized as work-in-process, where it has been verified but is not bundled and useable for the current business day.

A decisioning tool according to the invention may be adapted to consolidate verified and work-in-process inventories. The tool may also allocate a portion of unverified funds to be used to satisfy the minimum vault holding requirement. The FRB allows financial institutions to use a portion of their unverified funds toward the minimum vault holding requirement. However, the portion that is allocated changes daily based on the current day's ending balance and mix of denominations. The FRB calculates the ratio of 10s and 20s (which are the denominations used for the minimum vault holding requirement) to total unverified cash on the following business day based on the previous day's ending balance data. Because FRB requires that the decision on CI be made at 4 PM vault local time, earlier by as much as six hours than the time that vaults actually close for business, it is not known what the day's ratio will actually be. The decisioning tool according to the invention can utilize a statistically derived historical denominational breakdown ratio in lieu of the end of day ratio the FRB utilizes. This allocation enables the vault to better utilize the CI while still mitigating the risk of a vault holding violation.

Preferably following the inventory determination, the decisioning tool according to the invention can then output the decision that can be executed with the funds in the vault. Specifically, the tool can preferably provide information relating to whether a deposit is needed or funds should be withdrawn from the CI and also indicate the appropriate dollar amount of the transaction.

In order to offer a real-time, error-reducing tool, the following issues should be addressed. Real-time data decisioning should preferably be implemented as well as an ability to discriminate between inventory types—fully verified, work-in-process, and unverified, etc. When all inventories are viewed as one category, and there is no designation between work-in-process, then full advantage of fully verified and unverified inventory cannot be realized. When full advantage of verified and unverified inventory cannot be taken advantage of, the FRB guidelines for the CI program are prevented from being applied in the most productive manner.

Related to the lack of inventory groups, a tool according to the invention preferably includes functionality relating to using the portion of unverified holdings that can be allocated toward satisfying the minimum vault holding requirement. Furthermore, a tool according to the invention should preferably take physical space constraints for the CI vault into account in the decision-making process. Numerous CI sites are limited in what they can hold in their CI, not by the Cap the FRB establishes, but by a smaller physical space capacity. In addition, a structured process according to the invention should preferably be associated with the software in order to improve repeatability of implementation.

A CI decisioning tool according to the invention is preferably a real-time decisioning tool that enables a cash vault to determine how much money to move into or withdraw from CI. The tool preferably considers verified, work-in-process, and unverified cash in the vault (to the extent possible) and utilizes a factor to allocate unverified funds towards satisfying the minimum vault holding requirement. The tool also preferably recognizes both the FRB's calculated CI maximum as well as the vault's physical space constraint when determining the maximum amount of cash that can be put into the CI vault. Lastly, a CI decisioning process according to the invention includes not only the decisioning tool, but also an integrated process flow that dictates that cash balance information be retrieved in a particular order, after specific steps have been executed at the vault, in order to substantially reduce the risk to the bank for a vault holding violation.

The invention was motivated at least to solve the following problem. One goal of moving money into or out of Custodial Inventory each day is to maximize the amount of money that can be held in CI while still satisfying the FRB's minimum vault holding requirement.

If too much money is transferred from the bank's deposits to be deposited in CI, the vault is at risk for a vault holding violation because the bank's deposits may slip below the minimum vault holding requirement. When a vault incurs such a violation, the FRB follows a series of steps that can ultimately lead to the CI program being pulled from that vault if subsequent violations occur. This can result in a tarnished reputation for the bank as well as significant lost cost of funds and cross-shipping savings potential if the program is pulled.

If not enough money is transferred from the bank's deposits to be deposited in CI, the bank is losing opportunity from that transaction. Funds could have been moved from the bank's books to the FRB's books using the CI process, thus saving the bank in cost of funds, but were not. Also, if money is not deposited, the bank cannot withdraw that money at a later time. This could cause the vault to have to order funds directly from the FRB. Such an order from the FRB could potentially result in cross-shipping fees that would be assessed to the bank.

The CI decisioning process and tool according to the invention preferably provide cash vaults with a mechanism for determining how much cash needs to be moved into or out of their Custodial Inventory vault on a daily basis.

The CI Decisioning process and tool according to the invention also preferably mitigate the risk of incurring a vault holding violation while simultaneously striving to increase the bank's CI opportunity at any given cash vault. In one embodiment of the invention, the process details a set of actions to be executed by the cash vault team that enable them to make the decision regarding how much cash should be put into or withdrawn from CI. The process preferably gives the vault team the ability to make a decision that must be executed prior to 4 PM vault local time, when the FRB specifies that the CI vault must be settled. The process allows this decision to be made within a preferably predetermined margin for error, even though the information that the FRB uses to validate that the decision falls within FRB guidelines is not available until after the bank vault is settled much later in the evening. The next business day, the vault keys its ending balances into FedCash, and the application confirms that the total $10s and $20s left on the bank's books is equal to or greater than the minimum vault holding requirement.

One of the key risks in having to make this decision at 4 PM, even though the vault's ending balance may not be final until midnight, is that the vault may have less money on its books at the end of the day than it had at 4 PM when the decision to move money into CI is made. This scenario could lead to a vault holding violation.

In order to mitigate this risk, the CI decisioning process according to the invention may dictate that the vault pulls its 4:00 PM cash inventory information from the vault's inventory management system preferably only after specific events have occurred. The only way that the inventory level at the vault can decrease is if money is sent to customers to fill their change orders—i.e., returns of deposits, or other requests for cash, usually in specific denominations—or if money is shipped back to the Federal Reserve as excess. Thus, the process according to the invention may require the vaults to pull their respective cash balance data after they have ensured that these two activities have already occurred and will not be repeated for the remainder of the business day.

In a further embodiment of the invention, an algorithm according to the invention can track the historical differences in vault inventory at the 4:00 PM time—or other time that a decision regarding the CI should be made—versus the time when the vault actually closes for the day. This information could be used to forecast additional cash that will be on the vault's books by the end of the day, but is not there at the time of the CI decisioning process.

In a further embodiment of the invention, the data can be pulled in a specific order—from most downstream inventory—i.e., the closest to release outside the bank—to the most upstream inventory—i.e., the closest to the cash stored in the vault. Thus, the vault retrieves the fully verified balance, the non-useable verified balance, the work-in-process verified balance, and then the unverified balance. These steps, especially when followed in the order set forth above, can preferably account for cash flow as part of the decisioning process and significantly reduce the risk of the vault holding violation.

In an additional step according to the invention, the vault may retrieve information from the FRB's FedCash application. The information that can be pulled from FedCash may include the current CI ending balance, minimum vault holding requirement, and FRB calculated CI cap.

Once all data has been retrieved, a member of the vault team keys the data into the CI decisioning tool. The tool, according to the invention, may preferably be Excel-based, or based on some other suitable spreadsheet application. Once the data has been keyed, several checks are preferably performed to ensure that no cells in the spreadsheet have been left blank and that the data is in line with previous data entries. Alert messages can be displayed to the user if data fields are left blank or the numbers that are keyed in are significantly larger or smaller than previous data points.

Once the data is validated, as set forth above, the tool can perform calculations and decisioning logic to determine how much money should be deposited into or withdrawn from the Custodial Inventory. The tool can sum the fully verified $10s and $20s with the verified work-in-process inventory. Next, the unverified balance is multiplied by a ratio of $10s and $20s to total unverified cash (or some other suitable amount such as total cash on hand) that has been statistically derived from historical data. The use of this ratio is one of the unique components of the tool. The product of the unverified balance and the ratio is then added to the previously summed $10s and $20s. The new sum represents the total estimated $10s and $20s within the four walls of the vault.

Then, the difference between the total estimated number of $10s and $20s and the minimum vault holding requirement can be calculated. Additionally, the minimum between the FRB calculated CI Cap and the physical capacity of the vault can be determined and stored to be used as the maximum amount of inventory that can be held in the CI. Thus a tool according to the invention may include the allocation of unverified funds via an historical ratio, the physical capacity of the CI vault, and/or the various data checks.

Several steps of decisioning logic may follow the foregoing preliminary calculations. First, the spreadsheet according to the invention can check to determine whether the current CI vault balance is larger than the Cap. This can occur if the vault is limited by the FRB Cap as opposed to a physical space constraint. The Cap is typically recalculated by the FRB on a weekly basis and could change—e.g., increase or decrease—from one week to the next.

If the current CI balance is greater than the cap, the tool can take the maximum of either (current CI balance less the FRB Cap) or (minimum vault holding requirement less the total sum of $10s and $20s). The greater from the CI balance less the Cap and the minimum vault holding requirement less the total sum of $10s and $20s can then be rounded up to the nearest bundle (1,000 notes) increment. This rounded value can be displayed to the user as the amount of money that must be withdrawn from the CI. The user can then process the appropriate transaction on FedCash and the vault's inventory management system and physically withdraw the money from the CI inventory cages within the vault.

If the current CI balance is not greater than the FRB cap, several other logic steps can be checked. The tool according to the invention can then verify that the total of $10s and $20s in the vault is larger than minimum vault holding requirement. If the total of $10s and $20s in the vault is less than the minimum vault holding requirement, the tool can calculate the minimum of the current CI balance and the difference between the minimum vault holding requirement and the total $10s and $20s in the vault. This minimum can then be rounded up to the nearest bundle and outputted—e.g., displayed—to the user as the amount that can be withdrawn from the CI in order for the user to meet the minimum vault holding requirement. Again, the user can follow the appropriate steps by executing all required information system transactions and physically removing the cash from the CI cages.

If the current CI balance is not larger than the Cap and there are sufficient funds on the bank's books to satisfy the minimum vault holding requirement, the tool can then calculate how much cash can be moved into the CI in order to take maximum advantage of the CI available to the bank. The tool can take the minimum of the excess cash above and beyond the minimum vault holding requirement and the total fully verified $10s and $20s. If there is room for the entire amount of the excess cash above and beyond the minimum vault holding requirement in the CI in fully verified $10s and $20s, the tool can then round the value down to the nearest full bundle increment and display the amount to the user as the amount that can be deposited into CI. If there is not room for the entire amount in the CI, the tool can compute the difference between the Cap and the current CI balance. This difference will then be rounded down to the nearest bundle and displayed to the user as the amount that can be deposited into CI. As with the previous scenarios, the vault associates can then execute the appropriate transactions and physically move the cash into the CI vault.

At this point, the input and output data can be saved to a suitable spreadsheet, such as an Excel spreadsheet, according to the invention. Such a spreadsheet may be stored at a shared web site, and the decisioning process can be understood to have been completed for the current business day.

Additional embodiments of a Custodial Inventory decisioning tool according to the invention may include the following features. One feature of the invention may include a web-based interface instead of a remote, stand-alone spreadsheet version of the tool. Such a web-tool can be adapted to preferably receive data streams from vault inventory management systems.

A web-based version of the tool can preferably fully eliminate the risk of mis-keying or not keying vault inventory data because that data can be sent directly—i.e., uploaded—from system to system. The web-based version of the tool can also utilize the same basic logic for the decisioning process as the spreadsheet-based tool. In addition, more complex logic relating to the application of the ratio to the unverified vault holdings can also be implemented.

The web-based tool according to the invention can also preferably send e-mail or other suitable electronic notification to the vault users and vault management if the users have not accessed the tool and have provided a Custodial Inventory decision—i.e., a decision regarding transfer to or from the CI by a designated time. This reminder functionality can help prevent the vaults from incurring Force Settlement Exceptions, which are assessed when a vault does not settle its Custodial Inventory by the required 4 PM local time. Lastly, the web-based tool can utilize various levels of user access and provide more sophisticated reporting functionality.

The output of the invention process can be characterized as a defined Custodial Inventory decisioning process and spreadsheet and/or web-based Decisioning Tool. As stated above, some of the unique features of the Process include the following: a defined sequence of steps for pulling inventory data; a consideration of inventory at all stages of processing within the vault, and not just fully verified inventory; an allocation of unverified funds toward satisfying the minimum vault holding requirement through a historical, preferably statistically-derived, $10s and $20s ratio; and a consideration for the physical capacity of the CI vault.

Preferably, the invention provides a process that reduces the risk of incurring a vault holding violation, while simultaneously maximizing the Custodial Inventory opportunity. Such a process can preferably be applied to any corporation that produces cash management or financial software. Furthermore, the process can preferably be applied to any corporation involved in general revenue management. Additional, governmental institutions such as the Federal Reserve Bank may apply processes according to the invention to different aspects of the funds under their control.

Figure 1:
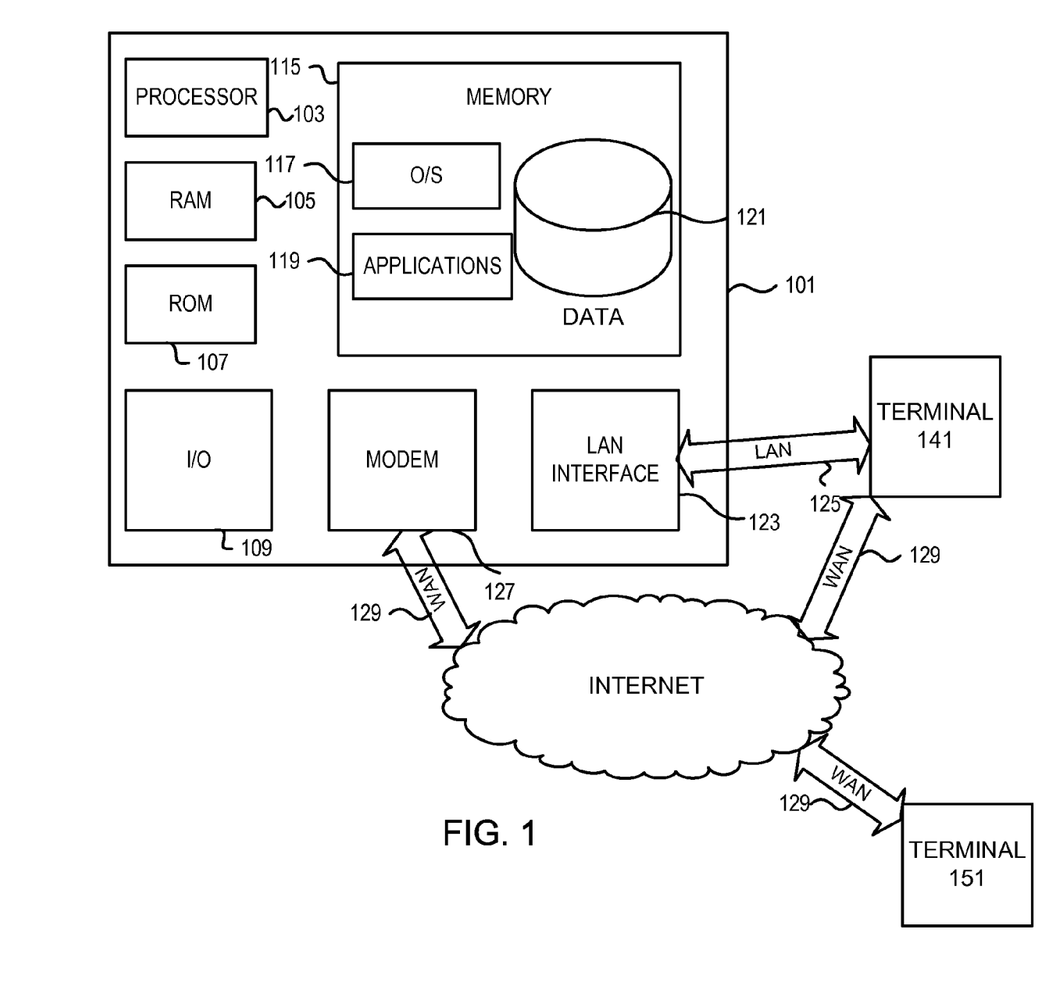
FIG. 1 illustrates a schematic diagram of a general-purpose digital computing environment in which one or more aspects of the present invention may be implemented.

FIG. 1 illustrates a block diagram of a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115.

I/O module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 121. Alternatively, some or all of server 101 computer executable instructions may be embodied in hardware or firmware (not shown). As described in detail below, database 121 may provide centralized storage of account information and account holder information for the entire business, allowing interoperability between different elements of the business residing at different physical locations.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119 used by server 101 according to an illustrative embodiment of the invention may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Figure 2:
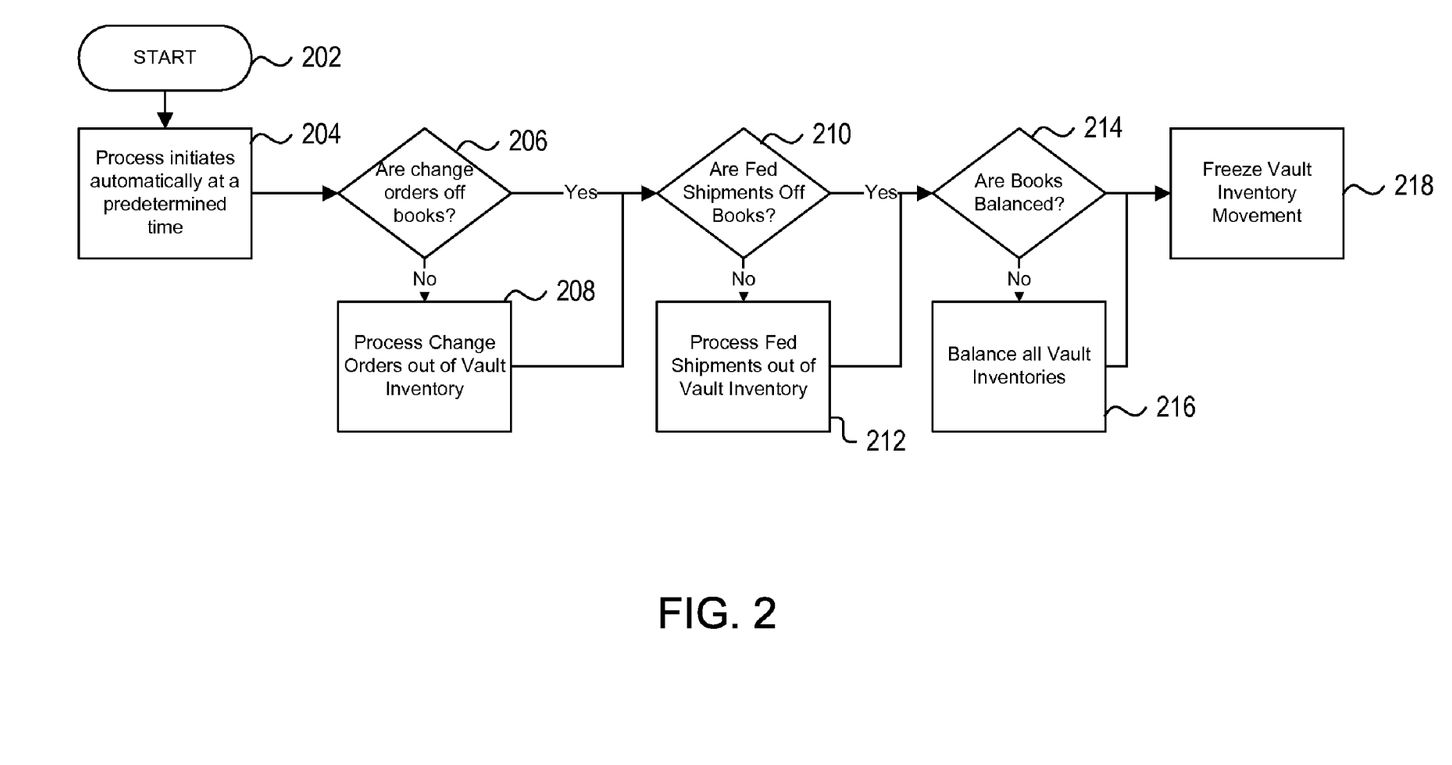
FIG. 2 is an illustrative flow diagram of a first process according to the invention.

FIG. 2 is an illustrative flow diagram of a first process according to the invention. This first process may actually form a portion of a larger process, but also may be considered its own process, independent of other processes. Step 202 shows the initiation of the decision process according to the invention. The decision process preferably can be used to determine how much money can be transferred into Custodial Inventory.

This process may be initiated automatically as shown in step 204, or manually—e.g., by an administrative agent such as a remote vault manager. The Custodial Inventory program is a Federal Reserve Bank program that allows banks to move money, specifically $10 and $20 notes, to the FRB's books while physically maintaining custody of the cash in their respective vaults. The CI program offers potential benefits to financial institutions in cost of funds savings and cross-shipping fees.

In step 206, the first decision making question is whether all change orders—i.e., returns of deposits, or other requests for cash, usually in specific denominations—are off the books?

If the answer is No, then step 208 continues to process change orders out of the vault inventory.

If the answer is Yes, then the process proceeds to step 210. Step 210 queries whether the excess money has been shipped back to the Federal Reserve, and is off the books.

If the answer is No, then step 212 would process all Fed shipments out of the vault inventory.

If the answer is Yes, then the process may query whether the bank's books are balanced, as shown at step 214?

If the answer is No, then step 216 sets forth balancing all vault inventories. In one preferred embodiment of the invention, the vault can retrieve cash balance information from its inventory management system in a specified order: first verified balance, then non-useable verified balance, then work-in-process verified balance, and lastly unverified balance. Retrieval in the order specified reduces the possibility that the vault will incur a vault holding violation. One of the Federal Reserve Bank requirements for a vault to participate in Custodial Inventory is that the vault maintain a minimum vault holding requirement of cash on the vault's books. The minimum vault holding requirement typically varies by vault and is generally recalculated weekly.

If the answer to the query in 214 is Yes, step 218 shows that all vault inventory movement freezes. Thus, steps 202-218 have preferably set forth the preliminary steps in order to make the further determinations necessary. Thereafter, the tool can perform additional logic and calculations to determine how much money should be deposited or withdrawn from the Custodial Inventory.

Figure 3:
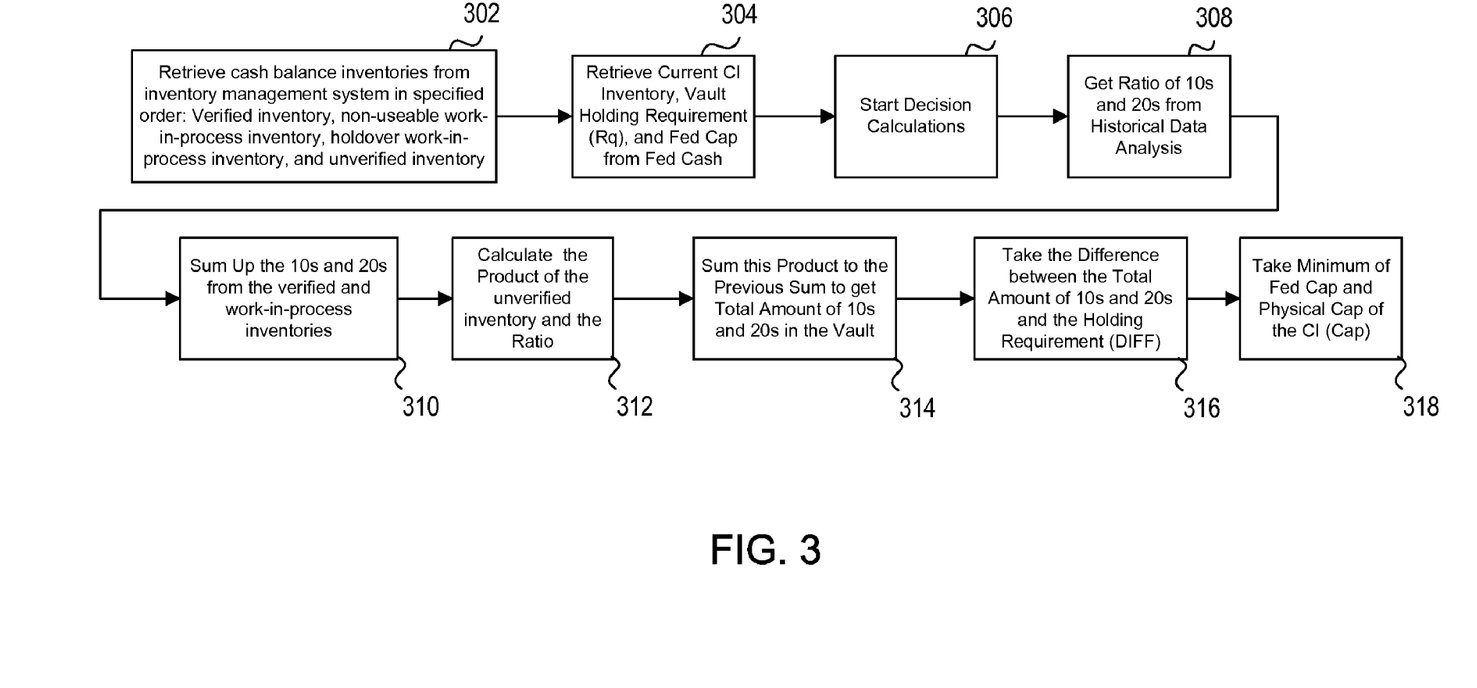
FIG. 3 is an illustrative flow diagram that shows certain calculations and logic steps that may be performed according to the invention.

FIG. 3 shows an illustrative flow diagram that shows certain calculations and logic steps that may be performed according to the invention. Following the preliminary steps, as set forth in steps 202-218, step 302 shows retrieving, the data may be automatically uploaded (or, alternatively, keyed into) a spreadsheet that performs several calculations and logic checks. The data may include verified balance, then non-useable verified balance, then work-in-process verified balance and lastly unverified balance. Preferably, the spreadsheet can perform certain predetermined validations to make sure that all data has been entered and that the data is within an appropriate range of previous data values.

Step 304 can instruct the vault to retrieve its current Custodial Inventory ending balance, minimum vault holding requirement, and Fed Cap from FedCash. FedCash is the Federal Reserve Bank tool used to process Custodial Inventory transactions.

Step 306 shows starting decision calculations. In step 308, the process can retrieve the ratio of $10s and $20s from a Historical Data Analysis. Such a ratio may preferably be updated using real data at some predetermined interval.

It should be noted that the decisioning tool not only consolidates verified and work-in-process inventories, but the tool can allocate a portion of unverified funds to be used to satisfy the minimum vault holding requirement as well. This ability to allocate a portion of unverified funds is one of the features of the invention.

It should be further noted that the allocation of unverified funds affects the CI decision since one issue affecting the CI decision is that the portion that is allocated changes daily based on the current day's ending balance data. Because a decision about the CI is typically made at 4 pm vault time, much earlier than vaults actually close for business, it is not known what the day's actual ratio will actually be. Thus, the tool utilizes a historical denominational breakdown ratio of 10s and 20s with respect to total amount in the vault in lieu of the ratio the Federal Reserve Bank utilizes. Once all data has been keyed, the spreadsheet executes calculations and logic statements to determine how much inventory can be moved into or must be moved out of Custodial Inventory.

Before the tool begins the next part of the process, it should be noted that another feature of the tool is that the tool utilizes inventory in various stages of processing throughout the vault and groups and allocates the inventory according to the Federal Reserve Bank's guidelines. Inventory within the vault can be fully counted, strapped and bundled. This inventory is categorized as fully verified. Then, at the other end of the spectrum, the inventory may be unverified and has not yet been sorted or counted. Lastly, inventory can be categorized as work-in-process, where it has been verified but is not bundled and useable for the current business day.

Step 310 shows summing the 10s and 20s from the verified and work-in-process inventories. Thereafter, the product of the unverified inventories and the ratio is calculated, as shown in step 312.

In step 314, the product of the unverified balance and the ratio is then added to the previously summed $10s and $20s. The new sum represents the total estimated $10s and $20s within the four walls of the vault.

Step 316 would take the difference between the total amount of $10s and $20s and the minimum vault holding requirement. For the purposes of this application, this difference is referred to as DIFF.

In step 318, the tool can take the minimum of either the Federal Reserve Bank calculated Custodial Inventory Cap or the physical capacity of the vault and store this value to be used as the maximum amount of inventory that can be held in the Custodial Inventory.

Figure 4:
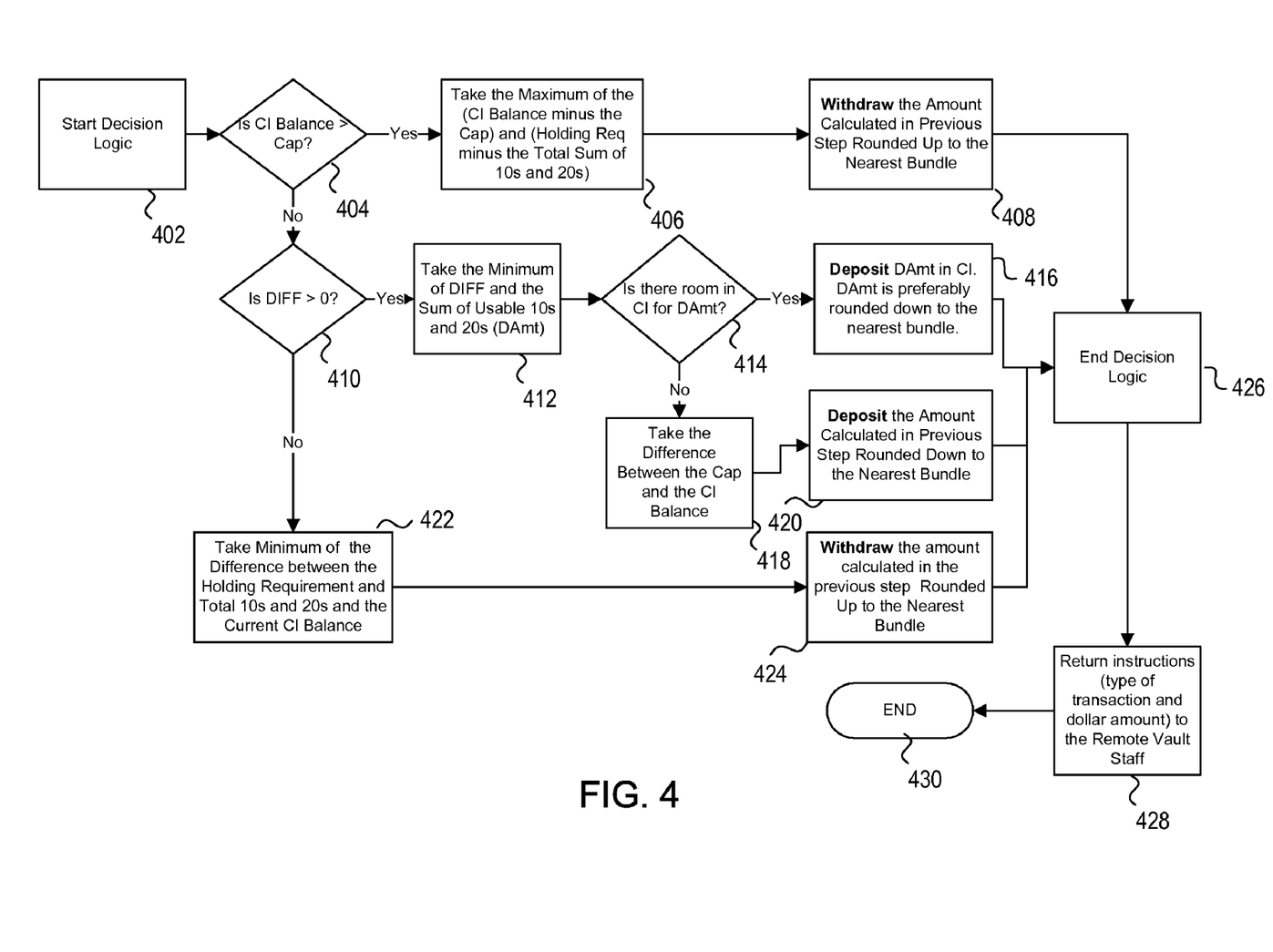
FIG. 4 is an illustrative flow chart that shows the decision logic for a process according to the invention.

FIG. 4 shows an illustrative flow chart wherein the decision logic for a process according to the invention is set forth. Step 402 can then begin the decision logic.

Step 404 shows determining whether the Custodial Inventory balance is greater than the Cap. The Custodial Inventory balance can be greater than the Cap when the vault is limited by the Federal Reserve Bank Cap as opposed to a physical space constraint. The FRB Cap is recalculated by the Federal Reserve Bank on a weekly basis and could decrease from one week to the next.

One embodiment of the invention can utilize a single ratio for the entire week, which can be recalculated and reassessed at the end of the week periodically. In other embodiments of the invention, an algorithm according to the invention can consider historical day of week data and could preferably automatically consider trends in the data. A substantially real-time and responsive ratio calculation/algorithm increases the accuracy of the tool according to the invention. Such increased accuracy may reduce vault holding violations even further while increasing utilization of the tool according to the invention.

If the answer is yes—i.e., the Custodial Inventory balance is greater than the Cap—than in step 406, the tool can take the greater of (current CI balance minus the Cap) and (minimum vault holding requirement minus the total sum of $10s and $20s). Thereafter, this greater of the two values can then be rounded up to the nearest bundle in (1,000 notes) increment.

In step 408, the greater of the two values can be displayed to the user as the amount of money that should be withdrawn from the Custodial Inventory. The user can then process the appropriate transaction on FedCash and the vault's inventory management system and can physically withdraw the money from the Custodial Inventory cages. Thereafter, the decision logic terminates, as shown at step 426, and the tool can return instructions to the remote vault staff regarding the type of transaction and dollar amount involved, as shown at step 428. The process end is shown at step 430.

When there are sufficient funds on the bank's books to satisfy the minimum vault holding requirement, the tool can then calculate how much cash can be moved into Custodial Inventory. Step 410 shows that if the current Custodial Inventory is not larger than the Cap then the process can further determine whether DIFF—i.e., the difference between the total amount of $10s and $20s and the minimum vault holding requirement—is greater than zero. If DIFF is greater than zero, then step 412 shows taking the minimum of DIFF and the Sum of Usable 10s and 20s (DAmt). Once DAmt is obtained, the process may query whether there is room in CI for DAmt, as shown in step 414.

If there is room in CI for DAmt, then step 416 shows depositing DAmt rounded down to the nearest bundle in CI. Thereafter, the tool can proceed to end the decision logic, as shown in step 426.

If there is no room in CI for DAmt, then step 418 shows taking the difference between the Cap and the CI balance. This amount, when rounded down to the nearest bundle, can then be deposited in CI, as shown in step 420. It should be noted that wherever a rounding to the nearest bundle is described herein, this rounding may, depending at least in part other parameters, be a rounding down, or a rounding up. In step 420, for example, a rounding up could occur if the other parameters were adjusted to allow for a margin for error between the amounted deposited in the CI and the Cap.

If DIFF is less than or equal to zero, then step 422 shows taking the lesser of (the difference between the holding requirement and the total 10s and 20s) and (the current CI balance). Thereafter, this amount can be withdrawn from the CI and returned to the bank's books, as shown in step 424. The decision logic can be ended at this point as shown in step 426.

Following the execution of the multiple steps as set forth in FIG. 4, the input and output data can be saved in Excel and the decisioning process may be considered complete for the current business day. Alternatively, the input and output data can be uploaded to a web-site.

Figure 5:
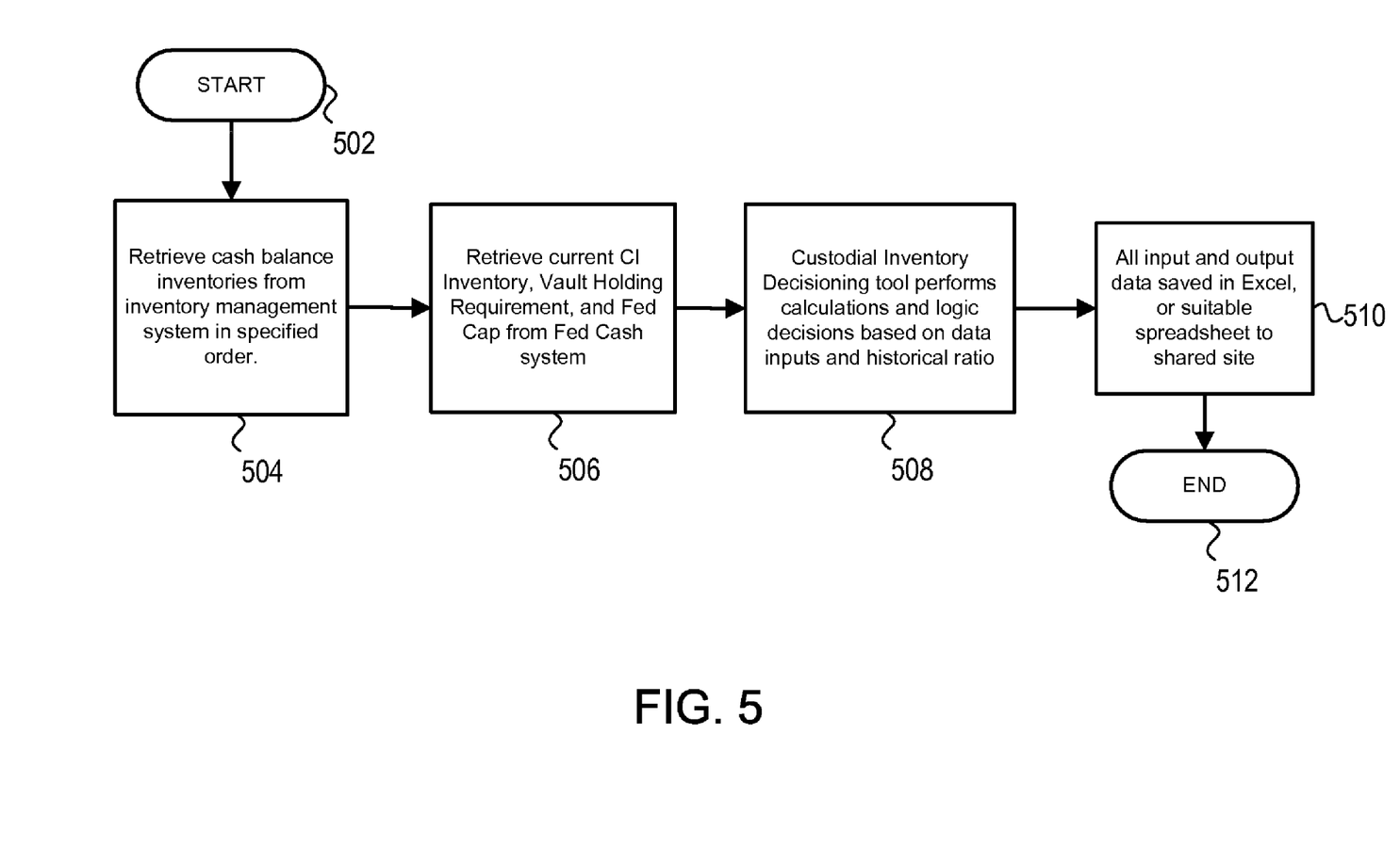
FIG. 5 is an illustrative flow diagram of an overview of a tool according to the invention.

FIG. 5 shows an illustrative flow diagram of an overview of the tool according to the invention. Step 502 shows starting the process. Step 504 shows retrieving cash balance inventories from an inventory management system in a preferably specified order. Step 506 shows retrieving the current CI inventory, vault holding requirement, and Fed Cap from the FedCash system. Step 508 shows using the CI tool based on data inputs and historical ratio. Finally, step 510 shows saving the input and output data in a suitable spreadsheet such as Excel or uploading the data to a shared site. Step 512 shows ending the process. Steps 504, 506, 508 and 510 may preferably be implemented using an information management system. The information may be used for performing logic operations and calculating a Custodial Inventory deposit or withdrawal amount from the CI as well as any of the other information transmission and/or storage needs of a system according to the invention.

FIG. 6 is a spreadsheet filled with exemplary values according to the invention. Fields 602-606, and 612 are dedicated to inventory. Field 602 shows the amount of work-in-process inventory 1; field 604 shows the non-useable work-in-process inventory 2; and field 606 shows non-useable work-in-process currency inventory 3. Fields 608, 610, 614 and 618 are for additional non-usable inventories. For example, if a vault has several pieces of equipment to process cash, a bank can have separate inventories for each piece. Then, subcategories for the funds in those inventories can also be established.

Fields 618 and 620 represent unverified balance 1 and unverified balance 2. Field 622 represents the fully verified balance. Field 624 represents minimum required bank vault holdings. Field 626 is for the current CI balance. Field 628 shows whether change orders, Fed ship outs, and cash conversions have been completed. Finally, field 630 provides an output field.

Figure 7:
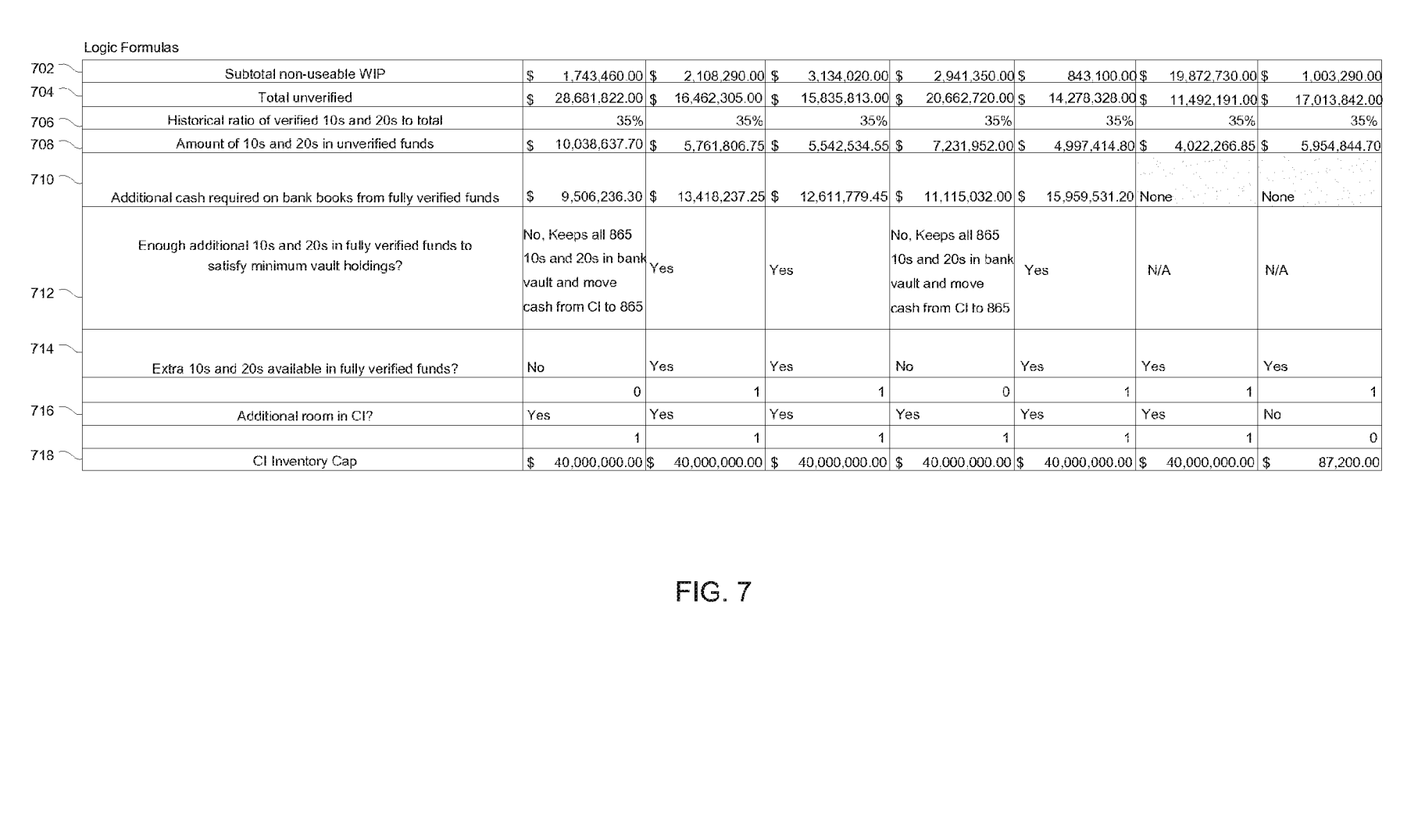
FIG. 7 is a spreadsheet showing logic formulas according to the invention.

FIG. 7 is a spreadsheet showing logic formulas according to the invention. Such formulas include a subtotal of the non-useable work-in-process, as shown in field 702, the total unverified balance as shown in field 704, the historical ratio of verified 10s and 20s to total as shown in field 706, and the amount of 10s and 20s in unverified funds, as shown in field 708.

The additional funds required on bank books from fully verified funds are set forth in field 710. A query is shown in field 712 for determining whether enough additional 10s and 20s in fully verified funds are available to satisfy minimum vault holdings.

Field 714 shows a determination whether extra 10s and 20s are available in fully verified funds. If extra 10s and 20s are available, then field 716 shows whether additional room is available in the CI. Finally, field 718 shows the current value of the CI Inventory Cap.

Figure 8:
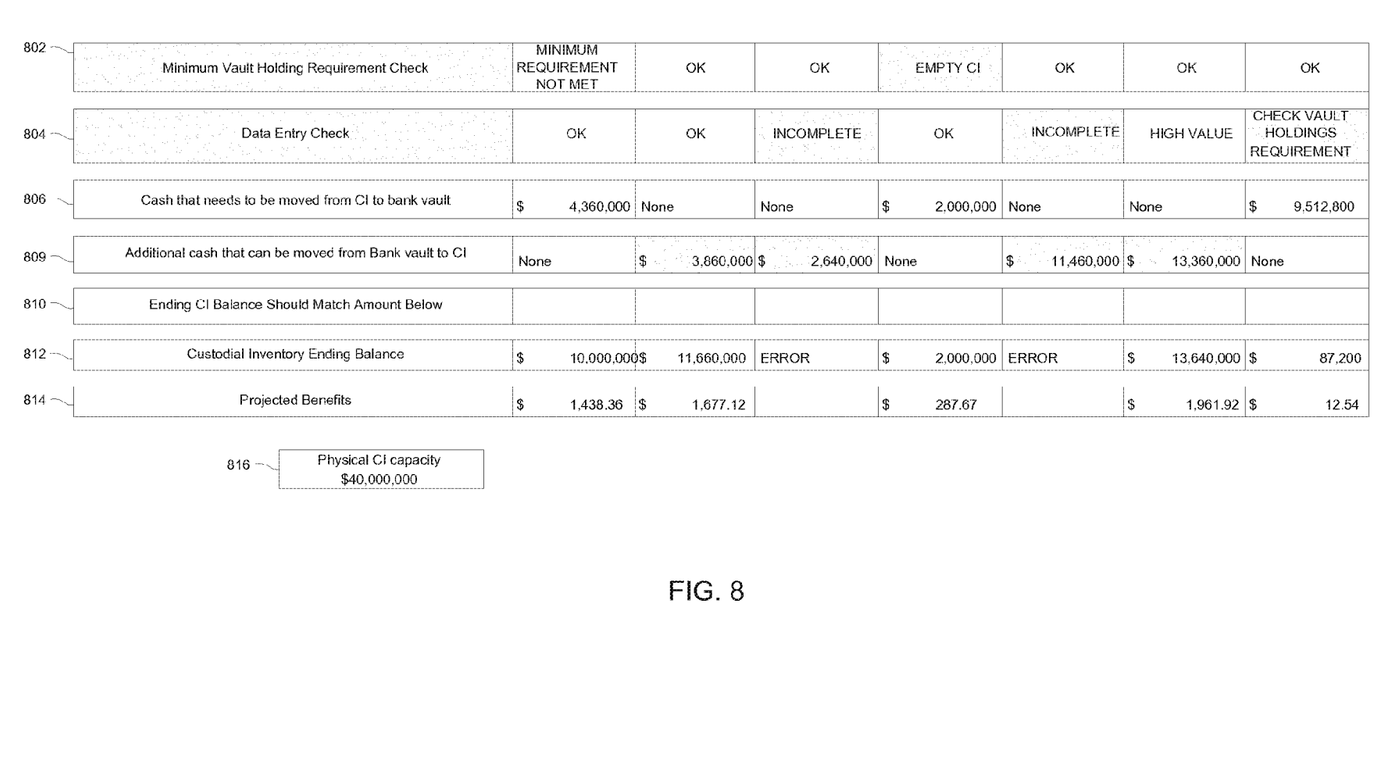
FIG. 8 is a chart that details the projected benefits of a process according to the invention.

FIG. 8 is a chart that details the projected benefits of a process according to the invention. In one exemplary embodiment, FIG. 8 may preferably use at least a portion of the information derived from the spreadsheets in FIGS. 6 and 7.

Field 802 shows the minimum vault holding requirement check. Field 804 shows the data entry check. Field 804 may be considered to be a validation check on the information already entered.

Field 806 shows the cash that needs to be moved from CI to the Bank vault. Field 808 shows additional cash that can be moved from the bank vault to CI. Field 810 shows a field which indicates that ending CI balance should match the amount below, as shown in field 812. A projected benefits field 814 is also shown. Field 814 preferably helps gauge the efficacy of the tool according to the invention. Finally, the physical capacity of the CI is shown in field 816.

Figure 9:
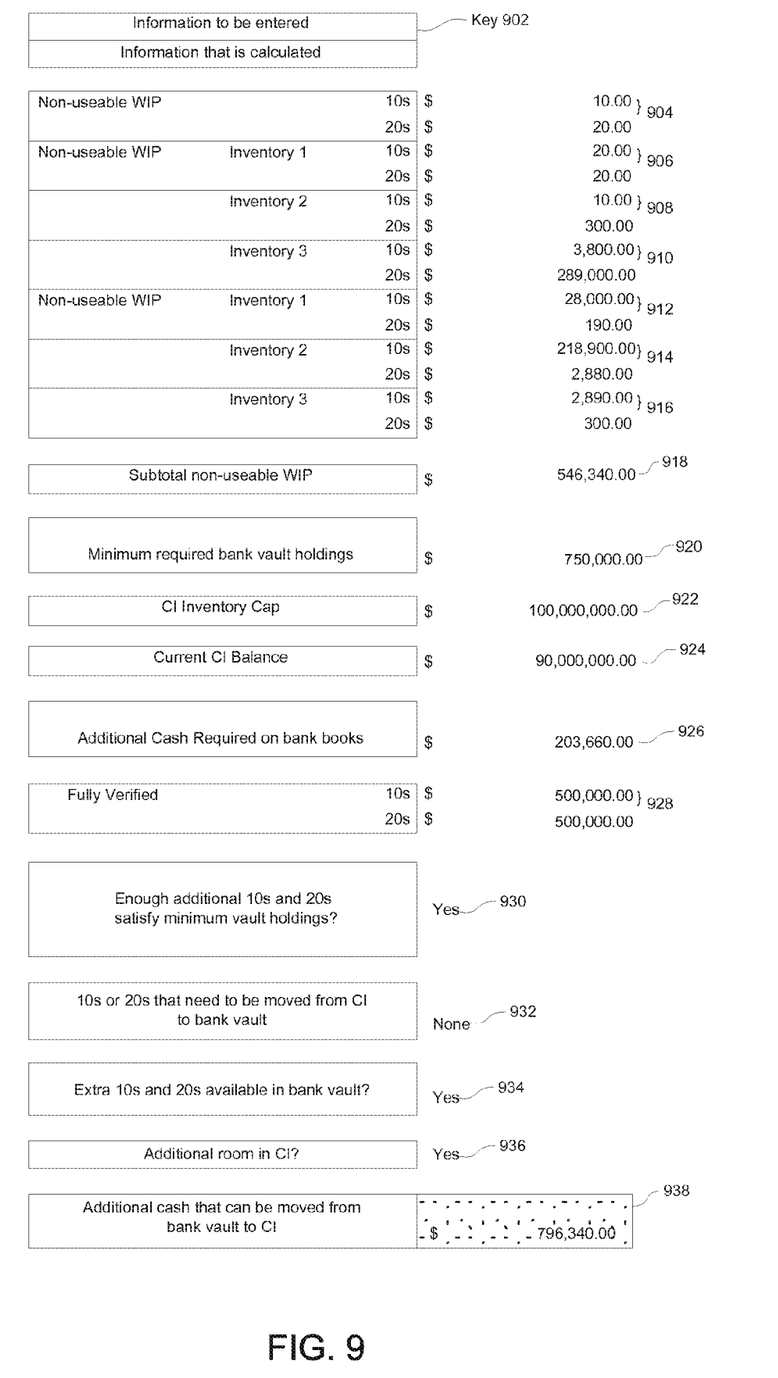
FIG. 9 is an exemplary user screen according to the invention.

FIG. 9 is an exemplary user input screen according to the invention. User screen includes two types of fields, as set forth in key field 902. Grayed areas are information to be entered—e.g., from other spreadsheets or determinations—and white areas are information that is to be calculated. Fields 904-916 correspond to fields 602-616 as shown in FIG. 6.

Field 918 shows the sub-total non-useable Work-In-Process. Field 920 shows the minimum required bank vault holdings. Field 922 shows CI inventory cap. Field 924 shows the current CI balance. Field 926 shows additional cash required on bank books. Field 928 shows fully verified cash. Field 930 shows whether there are enough 10s and 20s to satisfy minimum vault holdings. Field 932 shows the amount of 10s or 20s that need to be moved from CI to bank vault. Field 934 shows querying whether 10s and 20s available in bank vault? Field 936 queries whether additional room is available in CI. Finally, field 938 shows whether additional cash can be moved from bank vault to CI.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Aspects of the invention have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional. The methods and systems of the above-referenced embodiments may also include other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for enhancing compliance with the Federal Reserve Custodial Inventory procedures with according to the invention have been provided. Persons skilled in the art will appreciate that the present invention can be practiced by other than the described embodiments, which are presented for purposes of illustration rather than of limitation, and the present invention is limited only by the claims which follow.

What is claimed is:

1. A system for enhancing compliance with the Federal Reserve Custodial Inventory requirements, the system comprising:
    a processor module configured for:
        retrieving from an inventory management system physical space capacity information and cash balance inventory information, said physical space capacity information including an amount of space in a Custodial Inventory vault for holding 10 and/or 20 dollar bills, and said cash balance inventory information including information about an amount of unverified cash in inventory; and
        receiving from an information management system FedCash system information, said FedCash information including Custodial Inventory information, minimum vault holding requirement information and a Federal Reserve Cap for Custodial Inventory, said information management system for performing logic operations and calculating a Custodial Inventory deposit or withdrawal amount; and
    a display for displaying either an amount to be physically transferred into the Custodial Inventory vault or an amount to be physically transferred out of the Custodial Inventory vault based at least in part on the physical space capacity information, the cash balance inventory information, the FedCash information and a ratio of 10 and/or 20 dollar bills in unverified cash balance to a total unverified cash balance.

2. The system of claim 1 further comprising a spreadsheet application for receiving either the amount that can be deposited in the Custodial Inventory or the amount that can be withdrawn from the Custodial Inventory.

3. The system of claim 1 further comprising a communication system for automatically uploading output data on to a web site.

4. The system of claim 1 further comprising a database for use adjusting the ratio based on real-time data.

5. The system of claim 1 further comprising a database for use in calculating a difference between vault inventory at a time that a decision on the Custodial Inventory is required versus a vault closing time.

* * * * *